(12) United States Patent
Carpio et al.

(10) Patent No.: US 8,943,047 B1
(45) Date of Patent: Jan. 27, 2015

(54) DATA AGGREGATION FOR QUALIFYING A PARTNER CANDIDATE

(75) Inventors: Aliza Duenas Carpio, San Diego, CA (US); Alan F. Buhler, Escondido, CA (US); Joseph Elwell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 153 days.

(21) Appl. No.: 13/229,468

(22) Filed: Sep. 9, 2011

(51) Int. Cl.
*G06F 17/30* (2006.01)

(52) U.S. Cl.
USPC .......................... 707/723; 715/736; 715/778

(58) Field of Classification Search
CPC ................ G06F 17/30864; G06F 17/30696; G06F 17/2785; G06Q 30/02
USPC .................. 707/715, 736, 778, 723
See application file for complete search history.

(56) References Cited

U.S. PATENT DOCUMENTS

| | | | | |
|---|---|---|---|---|
| H1997 H | * | 10/2001 | Fleischer ........................ | 702/5 |
| 2005/0165819 A1 | * | 7/2005 | Kudoh et al. ................. | 707/101 |
| 2005/0283753 A1 | * | 12/2005 | Ho et al. ....................... | 717/102 |
| 2006/0161535 A1 | * | 7/2006 | Holbrook ........................ | 707/3 |
| 2007/0060129 A1 | * | 3/2007 | Ramer et al. .................. | 455/439 |
| 2009/0187553 A1 | * | 7/2009 | Sarkar et al. ...................... | 707/5 |
| 2009/0282034 A1 | * | 11/2009 | Goronzy et al. .................. | 707/5 |
| 2010/0185620 A1 | * | 7/2010 | Schiller ........................ | 707/738 |
| 2010/0250553 A1 | * | 9/2010 | Higuchi et al. ............... | 707/748 |
| 2011/0004483 A1 | * | 1/2011 | Ting et al. ...................... | 705/1.1 |
| 2011/0010365 A1 | * | 1/2011 | Garcia et al. .................. | 707/726 |
| 2011/0010448 A1 | * | 1/2011 | Gill et al. ...................... | 709/224 |
| 2011/0213796 A1 | * | 9/2011 | Kiyota et al. .................. | 707/769 |
| 2012/0185478 A1 | * | 7/2012 | Topham et al. ............... | 707/737 |
| 2013/0254192 A1 | * | 9/2013 | Work et al. .................... | 707/732 |

* cited by examiner

*Primary Examiner* — Hosain Alam
*Assistant Examiner* — Ahmed Abraham
(74) *Attorney, Agent, or Firm* — Osha Liang LLP (57) ABSTRACT

A method to qualify a partner candidate, including accessing a social network to retrieve social network data about the partner candidate; parsing the social network data to extract a social network data item corresponding to a characteristics category relating to a characteristic of the partner candidate; determining per category weighting factors corresponding to characteristics categories and representing a focus of the social network; comparing, using a keyword library comprising pre-determined keywords and pre-determined keyword similarity measures, the social network data item and a self-described attribute of the partner candidate to generate a characteristics category score, wherein a range of the characteristics category score is determined by a corresponding per category weighting factor; and assigning the characteristics category score to the self-described attribute, wherein the characteristics category score represents a validity measure of the self-described attribute based on the social network data.

22 Claims, 5 Drawing Sheets

DATA AGGREGATION FOR QUALIFYING A PARTNER CANDIDATE

BACKGROUND

Meeting a quality "life partner" online through the various dating websites is challenging because the information stated on a candidate's portfolio or profile is not always accurate. Dating websites do not check the validity of a person's qualities, such as physical attributes, past relationships, personalities, etc. Generally, visitors to dating websites are welcome to write up "stretched" information about who they are and what they are looking for. For those who are looking for "life partners," the dating websites do no always provide satisfactory results. A similar situation exists for other websites that allow a user to search for business partners. Throughout this disclosure, a website that focuses on searching for life partners or business partners is referred to as partner seeking website.

A social network is a social structure (e.g., community) made of members (e.g., a person or a user) connected by social relationships such as friendship, kinship, relationships of beliefs, knowledge, prestige, culture, etc. Individual computers linked electronically could form the basis of computer mediated social interaction and networking within a social network community. A social network service focuses on building online communities of people who share interests and/or activities, or who are interested in exploring the interests and activities of others. Most social network services are message based and provide a variety of ways (e.g., e-mail, instant messaging service, etc.) for users (or members) to interact socially via social network messages. Throughout this disclosure, the terms "social network" and "social network service" may be used interchangeably and refer to a computer mediated social network having computer servers to facilitate social interaction among members of the social network. Examples of computer mediated social network services include Facebook® (a registered trademark of Facebook, Inc., Palo Alto, Calif.), Myspace® (a registered trademark of Myspace, Inc., Beverly Hills, Calif.), Twitter® (a registered trademark of Twitter, Inc., San Francisco, Calif.), LinkedIn® (a registered trademark of LinkedIn, Ltd., Mountain View, Calif.), etc. Certain social network services provide application programming interfaces (APIs) allowing programmatic retrieval of social network messages by third party developers.

SUMMARY

In general, in one aspect, the invention relates to a method to qualify a partner candidate. The method includes accessing a first social network to retrieve first social network data about the partner candidate, parsing, by a processor of a computer system, the first social network data to extract a first social network data item corresponding to a characteristics category of a plurality of characteristics categories, wherein each of the plurality of characteristics categories relates to a characteristic of the partner candidate, determining, using a processor, a first plurality of per category weighting factors corresponding to the plurality of characteristics categories and representing a first focus of the first social network, comparing, using a keyword library comprising pre-determined keywords and pre-determined keyword similarity measures, the first social network data item and a self-described attribute of the partner candidate to generate a first characteristics category score, wherein the self-described attribute is associated with the characteristics category, and wherein a range of the first characteristics category score is determined by one of the first plurality of per category weighting factors corresponding to the characteristics category, and assigning the first characteristics category score to the self-described attribute, wherein the first characteristics category score represents a first validity measure of the self-described attribute based on the first social network data.

In general, in one aspect, the invention relates to a system to qualify a partner candidate. The system includes a hardware processor, a social network interface module executing on the hardware processor and configured to access a first social network to retrieve first social network data of the partner candidate, a reference data analyzer executing on the hardware processor, coupled to the social network interface, and configured to parse the first social network data to extract a first social network data item corresponding to a characteristics category of a plurality of characteristics categories, wherein each of the plurality of characteristics categories relates to a characteristic of the partner candidate, and determine a first plurality of per category weighting factors corresponding to the plurality of characteristics categories and representing a first focus of the first social network, a validation module executing on the hardware processor, coupled to the reference data analyzer, and configured to compare, using a keyword library comprising pre-determined keywords and pre-determined keyword similarity measures, the first social network data item and a self-described attribute of the partner candidate to generate a first characteristics category score, wherein the self-described attribute is associated with the characteristics category, and wherein a range of the first characteristics category score is determined by one of the first plurality of per category weighting factors corresponding to the characteristics category, and assign the first characteristics category score to the self-described attribute, wherein the first characteristics category score represents a first validity measure of the self-described attribute based on the first social network data.

In general, in one aspect, the invention relates to a non-transitory computer readable medium storing instructions to qualify a partner candidate. The instructions when executed by a computer includes functionality to access a first social network to retrieve first social network data about the partner candidate, parse the first social network data to extract a first social network data item corresponding to a characteristics category of a plurality of characteristics categories, wherein each of the plurality of characteristics categories relates to a characteristic of the partner candidate, determine a first plurality of per category weighting factors corresponding to the plurality of characteristics categories and representing a first focus of the first social network, compare, using a keyword library comprising pre-determined keywords and pre-determined keyword similarity measures, the first social network data item and a self-described attribute of the partner candidate to generate a first characteristics category score, wherein the self-described attribute is associated with the characteristics category, and wherein a range of the first characteristics category score is determined by one of the first plurality of per category weighting factors corresponding to the characteristics category, and assign the first characteristics category score to the self-described attribute, wherein the first characteristics category score represents a first validity measure of the self-described attribute based on the first social network data.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention retrieve reference data about a person through the person's interaction in various social media/sites/services to validate self-described attributes provided by this person (referred to as a partner candidate) in seeking a partner relationship. Social network sites such as Facebook®, LinkedIn®, Twitter® contain information about a person that is more consistent with who that person really is. For example, a person is less likely to stretch the truth on their Facebook® page/wall because their peers/friends (referred to as social network friends) would be the first to comment on it. LinkedIn® offers people the ability to recommend others, which makes it difficult for people to claim accomplishments they have not indeed achieved. LinkedIn® is also useful to find out if that person has a real job. Accordingly, embodiments of the invention harness the power of crowd sourcing by tapping into data that is readily available via social network sites/services such as Facebook®, Twitter®, LinkedIn®, etc. This data would represent the partner candidate's activities, profession, recommendations, etc. and provide a glimpse into the partner candidate's personality and achievements. Another person looking for a quality life partner or business partner would be able to see what the partner candidate's peers and employers say about him/her.

Figure 1:
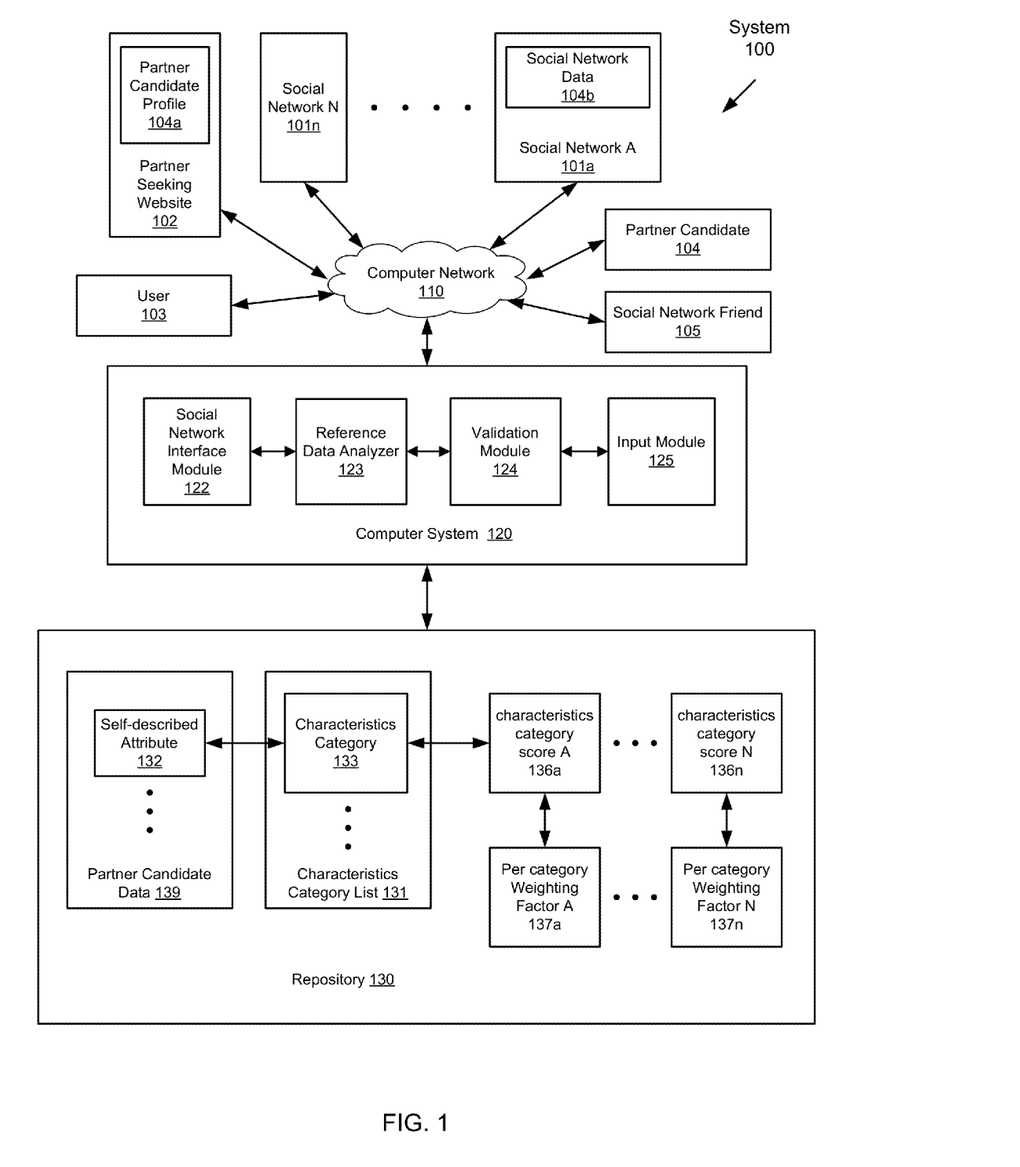
FIG. 1 shows a schematic diagram of a system of data aggregation for qualifying a partner candidate in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes various components coupled via computer network (110), These components include social networks (e.g., social network A (101a), social network N (101n)), partner seeking website (102), user (103), partner candidate (104), social network friend (105), and computer system (120). In one or more embodiments, the computer network (110) may include wired and/or wireless portions of the Internet and/or other data communications networks such as wide area networks (WANs), local area networks (LANs), etc. As shown, the partner seeking website (102) includes partner candidate profile (104a) while the social network server A (101a) includes social network data (104b). Further, the computer system (120) is configured to execute social network interface module (122), reference data analyzer (123), validation module (124), and input module (125). In one or more embodiments, the social network interface module (122), reference data analyzer (123), validation module (124), and input module (125) are software applications installed onto the computer system (120). The user (103), partner candidate (104), and social network friend (105) are individual persons having computing devices to access, via the computer network (110), the social networks (e.g., social network A (101a), social network N (101n)) and the partner seeking website (102), which in turn are provided with computer facilities to perform the functions they are configured for.

Further as shown in FIG. 1, the system (100) includes repository (130) operatively coupled to the computer system (120). The repository (130) may be used for storing partner candidate data (139) including various self-described attributes (e.g., self-described attribute (132)), a characteristics category list (131) including various characteristics categories (e.g., characteristics category (133)), multiple characteristics category scores (e.g., characteristics category score A (136a), characteristics category score N (136n)), and multiple per category weighting factors (e.g., per category weighting factor A (137a), per category weighting factor N (137n)). The repository (130) (and/or any of the data collections stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The repository (130) may be a device internal to the computer system (120). Alternatively, the repository (130) may be an external storage device operatively connected to the computer system (120).

In one or more embodiments, the user (103) and the partner candidate (104) are users (e.g., an individual, a person) of the partner seeking website (102), which is configured to allow its user to search for one or more partners based on a certain user agreement. Depending on the focus of the partner seeking website (102), such partner may be a life partner, a business partner, or other types of partner. For example, the partner candidate (104) may be a user of the partner seeking website (102) and has posted his/her personal information in the partner candidate profile (104a). Such personal information may include one or more of residence city, marital status, age, birthday, school, profession, title, job history, philosophy, political views, and interests in music, books, movies, TV shows, games, activities, etc. Accordingly, the user (103) may browse the information of the partner candidate (104) in the partner candidate profile (104a) to determine whether the partner candidate (104) is a suitable partner that the user (103) is searching for. As noted above, the user agreement of the partner seeking website (102) may not effectively preclude the partner candidate (104) from exaggerating or falsifying self-described personal information in the partner candidate profile (104a). Throughout this disclosure, such self-described personal information is referred to as the self-described attribute of the partner candidate. Further, the term "self-described attribute" refers specifically to self-described personal information provided by the partner candidate to partner seeking websites (e.g., partner seeking website (102)).

In one or more embodiments, the partner candidate (104) and social network friend (105) are members (e.g., an individual, a person) of one or more of social networks (e.g., social network A (101*a*), social network N (101*n*)), which are configured to allow their users to establish "friend" relationships and exchange information (e.g., sending messages, posting comments, etc.) among such social network "friends". Depending on the focus of the social network, such messages and/or comments may be personal-related or work related. Typically, the personal comments are more casual-oriented and the work related comments are more profession oriented. The social network data (104*b*) may be associated with the partner candidate (104) and include various comments from multiple social network "friends" of the partner candidate (104). For example, such comments may relate to characteristics of the partner candidate (104), such as residence city, marital status, age, birthday, school, profession, title, job history, philosophy, political views, and interests in music, books, movies, TV shows, games, activities, etc. For example, the social network friend (105) may be a social network "friend" of the partner candidate (104) and has posted his/her comments regarding the partner candidate (104) in the social network data (104*b*) associated with the partner candidate (104). As noted above, content of the social network data (104*b*) is less likely to be exaggerated or falsified because any one of the multiple social network "friends" of the partner candidate (104) may comment on any such exaggerations or falsified information.

Turning to each of the components within the computer system (120), in one or more embodiments of the invention, the computer system (120) includes the input module (125) that is configured to retrieve information from the partner candidate profile (104*a*) of the partner candidate (104) that is stored in the partner seeking website (102). In one or more embodiments, such retrieved information is stored in the repository (130) as the partner candidate data (139). For example, the retrieved information may include one or more of residence city, marital status, age, birthday, school, profession, title, job history, philosophy, political views, and interests in music, books, movies, TV shows, games, activities, etc. that is initially provided by the partner candidate (104) in the partner candidate profile (104*a*) and, once retrieved, is stored as the self-described attributes (e.g., self-described attribute (132)) in the partner candidate data (139).

In one or more embodiments, retrieving information from the partner candidate profile (104*a*) by the input module (125) is triggered by the user (103) browsing the partner seeing website (102) to view information about the partner candidate (104). For example, the input module (125) may receive a signal or message from the partner seeking website (102) indicating that information regarding the partner candidate (104) is being accessed. Once the input module (125) retrieves the information in the partner candidate profile (104*a*), subsequent activities of other modules in the computer system (120) are initiated to generate a score representing trustworthiness of the information contained in the partner candidate profile (104*a*). Details of such subsequent activities are described below with respect to each modules of the computer system (120).

In one or more embodiments of the invention, the computer system (120) includes the social network interface module (122) that is configured to access a social network (e.g., social network A (101*a*), social network N (101*n*)) to retrieve social network data of the partner candidate (104). In one or more embodiments, such access is based on application programming interface (API) provided by the social network. For example, the social network data (104*b*) includes comments posted by social network friends of the partner candidate (104) and is retrieved by the social network interface module (122) using the API of the social network A (101*a*). In one or more embodiments, the partner candidate (104) is identified by the social network interface module (122) in the social network (e.g., social network A (101*a*), social network N (101*n*)) based on identification information (e.g., screen name, user name, or other types of identification) found in the partner candidate profile (104*a*). As discussed above, the retrieved comments may include one or more of residence city, marital status, age, birthday, school, profession, title, job history, philosophy, political views, and interests in music, books, movies, TV shows, games, activities, etc. of the partner candidate (104) as posted by the social network friend (105).

In one or more embodiments of the invention, the computer system (120) includes the reference data analyzer (123) that is configured to analyze the social network data (104*b*) as a reference to be used in validating information (e.g., retrieved as self-described attribute (132)) in the partner candidate data (139). First, the reference data analyzer (123) parses the social network data (104*b*) to extract a social network data item corresponding to a characteristics category (e.g., characteristics category (133)) in the characteristics category list (131). In particular, each characteristics category (133) in the characteristics category list (131) relates to a partner candidate's characteristics, such as residence city, marital status, age, birthday, school, profession, title, job history, philosophy, political views, and interests in music, books, movies, TV shows, games, activities, etc. Accordingly, each extracted social network data item is categorized and corresponds to one particular partner candidate characteristics. In one or more embodiments, the aforementioned characteristics may be categorized into a relationship preference category, a financial reliability category, a personality category, a residence address category, a marital status category, a social status category, an age category, a personal interest category, a working profession category, a school history category, a political views category, and a physical appearance category. In one or more embodiments, the social network data items are extracted and categorized into these categories using semantic analysis techniques.

Further, the reference data analyzer (123) determines, for each social network (e.g., social network A (101*a*)), a set of per category weighting factors (e.g., per category weighting factor A (137*a*)) corresponding to the characteristics categories (e.g., characteristics category (133)) in the characteristics category list (131). Specifically, the set of per category weighting factors collectively represent a focus of the corresponding social network. For example, the social network A (101*a*) may be a personal comments oriented social network and per category weighting factors (e.g., per category weighting factor A (137*a*)) may be higher for personal-oriented categories such as relating to birthday, interests in music, books, movies, TV shows, games, activities, etc. as compared to work related categories such as school, profession, title, job history, etc. In another example, the social network N (101*n*) may be a profession oriented social network and per category weighting factors (e.g., per category weighting factor N (137*n*)) may be higher for work related categories such as relating to school, profession, title, job history, etc. as compared to personal-oriented categories such as birthday, interests in music, books, movies, TV shows, games, activities, etc.

In one or more embodiments, the per category weighting factors of a social network are determined based on frequency of occurrence of social network data items found in each characteristics category. For example, social network data items in personal-oriented categories are expected to occur more frequently in a personal comment oriented social network while social network data items in work-oriented categories are expected to occur more frequently in a profession oriented social network. In one or more embodiments, the per category weighting factors are determined based on frequency of occurrence of social network data items associated with the partner candidate. In one or more embodiments, the per category weighting factors are determined based on frequency of occurrence of social network data items associated with a list of social network friends of the partner candidate. In one or more embodiments, the per category weighting factors are determined based on frequency of occurrence of social network data items found across a large sample of social network members.

In one or more embodiments of the invention, the computer system (120) includes validation module (124) that is configured to generate one or more characteristics category scores (e.g., characteristics category score A (136a), characteristics category score N (136n)) for each self-described attribute (e.g., self-described attribute (132)) in the partner candidate data (139) based on the reference information of one or more social networks (e.g., social network A (101a), social network N (101n)) provided by the reference data analyzer (123). Specifically, the validation module (124) compares a categorized social network data item (e.g., in the social network data (104b)) and the self-described attribute (132) in the same characteristics category (133) to generate a characteristics category score A (136a). Similarly, the validation module (124) compares another categorized social network data item (e.g., retrieved from the social network N (101n)) and the self-described attribute (132) in the same characteristics category (133) to generate another characteristics category score N (136n).

In one or more embodiments, such characteristics category score represents a validity measure of the self-described attribute based on the social network data. In one or more embodiments, the comparing step is based on semantic analysis techniques, such as using a library of keywords and an associated matrix of keyword similarity measures. In particular, keyword similarity measures are indexed in the matrix by keyword pairs. For example, the social network data item may be matched to a first keyword in the library while the self-described attribute is matched to a second keyword in the library. Accordingly, a keyword similarity measure is retrieved from the matrix of keyword similarity measures based on the first keyword and the second keyword. In one or more embodiments, the keyword library is specific to the characteristics category. For example, the keyword library may include keywords such as Divorced, Single, In a relationship, Separated, Engaged, Civil Union, Married, etc. for the characteristics category of "marital status." The matrix of similarity measure may include (i) similarity measure (Divorced, Married)=0% and (ii) similarity measure (Divorced, Single)=80%. In another example, the keyword library may include keywords such as Techno Music, Electronic Music, etc. for the characteristics category of "interest in music." The matrix of similarity measure may include similarity measure (Techno Music, Electronic Music)=90%. In one or more embodiments, such similarity measure is converted to the characteristics category score based on a range of the characteristics category score where 100% corresponds to the top end of the range and 0% corresponds to a bottom end of the range.

In one or more embodiments, the range of the characteristics category score A (136a) is determined by the per category weighting factor A (137a) representing the focus of the social network A (101a) in the characteristics category (133) while the range of the characteristics category score N (136n) is determined by the per category weighting factor N (137n) representing the focus of the social network N (101n) in the characteristics category (133). For example, the range of the characteristics category score A (136a) for the characteristics category (133) of "interest in music" may be 0 to 100 or "no match" to "perfect match" based on the personal/casual focus of the social network A (101a) while the range of the characteristics category score N (136n) for the characteristics category (133) of "interest in music" may be "zero" to "ten" or "no match" to "possible match" based on the work related focus of the social network N (101n).

Based on the foregoing, the characteristics category score is assigned to the self-described attribute to represent a validity measure of the self-described attribute based on the social network data. For example, the characteristics category score A (136a) represents a validity measure of the self-described attribute (132) based on the social network data (104b) while the characteristics category score N (136n) represents another validity measure of the self-described attribute (132) based on the social network data of the social network N (101n).

In one or more embodiments, the validation module (124) is further configured to aggregate the characteristics category score A (136a) and the characteristics category score N (136n) to generate an aggregated characteristics category score representing an aggregated validity measure of the self-described attribute (132). Specifically, such aggregated validity measure is based on the social network data of the social network A (101a) and social network N (101n). In one or more embodiments, the validation module (124) is further configured to aggregate the characteristics category score A (136a) and the characteristics category score N (136n) by a simple mathematical addition. In one or more embodiments, the validation module (124) is further configured to aggregate the characteristics category score A (136a) and the characteristics category score N (136n) using a weighted average formula based on the per category weighting factor A (137a) and the per category weighting factor N (137n). Although two social networks are used in the description above, one skilled in the art with the benefit of this disclosure, will appreciate that more than two social networks may be used in generating the aggregated characteristics category score to represent an aggregated validity measure of the self-described attribute (132). Further, one or more of the multiple social networks may be substituted by other types of verifiable information source, such as online application software provider of which the partner candidate (104) is a user and opts to share personal information based on a user agreement.

Figure 2:
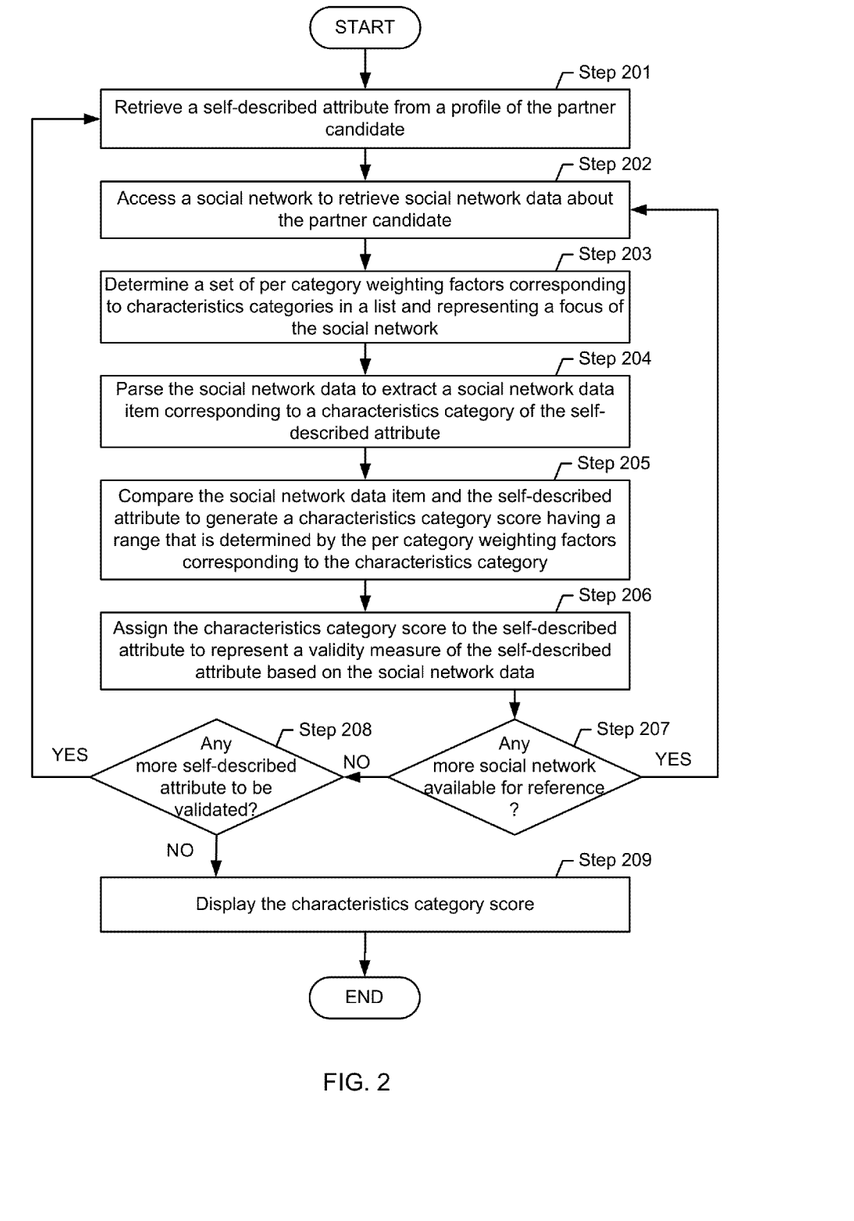
FIG. 2 shows a flowchart of a method of data aggregation for qualifying a partner candidate in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

As noted above, the method depicted in FIG. 2 retrieves reference data (e.g., social network comments) about a person (referred to as a partner candidate) through the person's interaction in various social media/sites/services and/or other verifiable sources to validate self-described attributes in a profile provided by this person to a partner seeking website. In one or more embodiments, when another person browses information regarding this partner candidate in the partner seeking website, such automatically retrieved reference data and categorized scores (referred to as characteristics category scores) derived therefrom are displayed or otherwise provided. In one or more embodiments, automatically retrieved reference data and derived categorized scores from multiple sources are aggregated based on a pre-determined criterion according to different focuses of the sources, as represented by the aforementioned per category weighting factors for a list of characteristics categories.

Initially in Step 201, a self-described attribute is retrieved from a profile provided by the partner candidate to the partner seeking website. In one or more embodiments, the self-described attribute is retrieved by analyzing the profile with respect to a characteristics category in the list of characteristics categories. In one or more embodiments, the profile is analyzed using semantic analysis techniques with respect to characteristics categories such as relating to residence city, marital status, age, birthday, school, profession, title, job history, philosophy, political views, and interests in music, books, movies, TV shows, games, activities, etc.

In one or more embodiments, characteristics categories may be more generically defined, such as a relationship preference category, a financial reliability category, a personality category, a residence address category, a marital status category, a social status category, an age category, a personal interest category, a working profession category, a school history category, a political views category, and a physical appearance category.

In one or more embodiments, information in the profile is analyzed with respect to each characteristics category in the list to obtain multiple self-described attributes in all characteristics categories. Each of these multiple self-described attributes is then validated based on social network data of the partner candidate as described in subsequent method steps 202-208 below.

In one or more embodiments, retrieving one or more self-described attributes to be validated is in response to receiving an indication that information related to the partner candidate is being accessed at the partner seeking website. Accordingly, characteristics category scores that are generated through subsequent method steps 202-208 and representing validity of these multiple self-described attributes are made available for browsing alongside the profile of the partner candidate in the partner seeking website.

In Step 202, a social network is accessed to retrieve social network data about the partner candidate for reference. As discussed above, the social network data is retrieved in response to retrieving one or more self-described attribute(s). In one or more embodiments, the social network data is retrieved for use as reference information to validate the one or more self-described attribute(s) about the partner candidate. In particular, the social network data includes posted information (e.g., messages, comments, etc.) submitted to the social network by the partner candidate and/or social network friends of the partner candidate. Generally, such posted messages and comments may include one or more of residence city, marital status, age, birthday, school, profession, title, job history, philosophy, political views, and interests in music, books, movies, TV shows, games, activities, etc. of the partner candidate as posted in the social network.

In one or more embodiments, the social network is accessed to retrieve the social network data using an application programming interface of the social network. In one or more embodiments, the social network is accessed to retrieve the social network data by obtaining an access credential for an account of the partner candidate in the social network. In one or more embodiments, the partner candidate is identified in the social network based on identification information (e.g., screen name, user name, or other identification) found in the partner candidate profile in the partner seeking website.

As discussed above, the self-described attributes and the social network data are categorized according to a list of characteristics categories for comparison purposes. In Step 203, a set of per category weighting factors corresponding to these characteristics categories are determined for a social network to represent a focus of the social network from which the social network data is retrieved.

In one or more embodiments, the per category weighting factors of a social network are determined based on frequency of occurrence of various information found in each characteristics category. In one or more embodiments, the frequency of occurrence of various information may be determined by applying semantic analysis techniques to analyze all posted information with respect to each characteristics category.

For example, the social network may be a personal comments oriented social network where posted information relating to personal-oriented categories such as birthday, interests in music, books, movies, TV shows, games, activities, etc. may occur more frequently as compared to posted information relating to work related categories such as school, profession, title, job history, etc. Accordingly, per category weighting factors may be set higher for the relationship preference category, the personality category, the residence address category, the marital status category, the social status category, the age category, the personal interest category, the political views category, the physical appearance category, etc. based on frequency of occurrence of corresponding types of information found in the social network postings.

In another example, the social network may be a profession oriented social network and posted information relating to work related categories such as school, profession, title, job history, etc. may occur more frequently as compared to posted information relating to personal-oriented categories such as birthday, interests in music, books, movies, TV shows, games, activities, etc. Accordingly, per category weighting factors may be set higher for the financial reliability category, the working profession category, the school history category, etc. based on frequency of occurrence of corresponding types of information found in the social network postings.

In one or more embodiments, the per category weighting factors are determined based on frequency of occurrence of posted information associated with the partner candidate. In such embodiments, Step 203 may be performed in combination with Step 204 described below. In one or more embodiments, the per category weighting factors are determined based on frequency of occurrence of posted information associated with a list of social network friends of the partner candidate. In one or more embodiments, the per category weighting factors are determined based on frequency of occurrence of posted information across a large sample of social network members. Step 203 and Step 204 may be performed separately in those embodiments where posted information associated with social network friends of the partner candidate and/or posted information across a large sample of social network members are involved.

In Step 204, the social network data obtained in Step 202 is parsed to extract a social network data item corresponding to a characteristics category of the self-described attribute obtained in Step 201 above. In one or more embodiments, the characteristics category of the self-described attribute is first identified using semantic analysis techniques such that the social network data is parsed with respect to the same characteristics category using the same semantic analysis techniques to extract the social network data item. Accordingly, the self-described attribute and the social network data item are in the same characteristics category for comparison in Step 205.

In Step 205, the self-described attribute and the social network data item are compared based on a keyword library of pre-determined keywords specific to the characteristics category and a matrix of pre-determined keyword similarity measures indexed in the keyword library by keyword pairs. In one or more embodiments, the social network data item is matched to a first keyword in the keyword library while the self-described attribute is matched to a second keyword in the keyword library. Based on the matched keywords, a keyword similarity measure is retrieved from the matrix of pre-determined keyword similarity measures indexed by the first keyword and the second keyword. Accordingly, a characteristics category score is generated based on the keyword similarity measure. In one or more embodiments, the characteristics category score is normalized to consider the focus of the social network. For example, characteristics category score in personal-related categories are emphasized if it is derived from information posted in a personal-oriented social network. Vice versa, characteristics category score in work-oriented categories are emphasized if it is derived from information posted in a profession-oriented social network. In one or more embodiments, the possible range of the characteristics category score is determined by the per category weighting factors corresponding to the characteristics category. Accordingly, the range of the category score is normalized to be consistent with the focus of the social network from which the category score is generated.

In Step 206, the characteristics category score is assigned to the self-described attribute as a validity measure of the self-described attribute based on the social network data. In Step 207, a determination is made as to whether any other social network is available for reference to further validate the particular self-described attribute obtained in Step 201. If the answer is yes, the method returns to Step 202 where another social network is accessed to retrieve posted information as additional social network data. Accordingly, this additional social network data is analyzed by Steps 203 through 206 to generate another characteristics category score. In one or more embodiments, multiple characteristics category scores generated based on information posted in multiple social networks about the partner candidate are aggregated based on a pre-determined formula to generate an aggregated characteristics category score. Such aggregated characteristics category score represents an aggregated validity measure of the self-described attribute of the partner candidate in the particular characteristic category.

In one or more embodiments, the aggregated characteristics category score are aggregated by adding all individual characteristics category scores derived from each of the social networks where reference information are obtained. Depending on the focus of each social network, contribution from the corresponding individual characteristics category score is normalized based on the inherent range of each individual characteristics category score as initially determined based on the corresponding per category weighting factor.

In one or more embodiments, the aggregated characteristics category score are aggregated using a weighted average formula based on the per category weighting factor of each social network where reference information is obtained. In such embodiments, depending on the focus of each social network, contribution from the corresponding individual characteristics category score is further emphasized in addition to the inherent range of each individual characteristics category score as initially determined based on the corresponding per category weighting factor.

When all available social networks are accessed for reference information, the method proceeds to Step 208 where another determination is made as to whether this is any other self-described attribute of the partner candidate that has not been validated yet. If the answer is no, the method proceeds to Step 209 where the characteristics category score is displayed. If the answer is yes, the method returns to Step 201 where another self-described attribute is retrieved from the partner seeking website to be validated based on the Steps 202 through 206.

In addition to validating the partner candidate provided information (i.e., self-described attribute) using reference information obtained from social networks, other verifiable information sources may also be used. Example of such verifiable information sources include online application software provider of which the partner candidate is a user and opts to share personal information based on a user agreement.

Figure 3A:
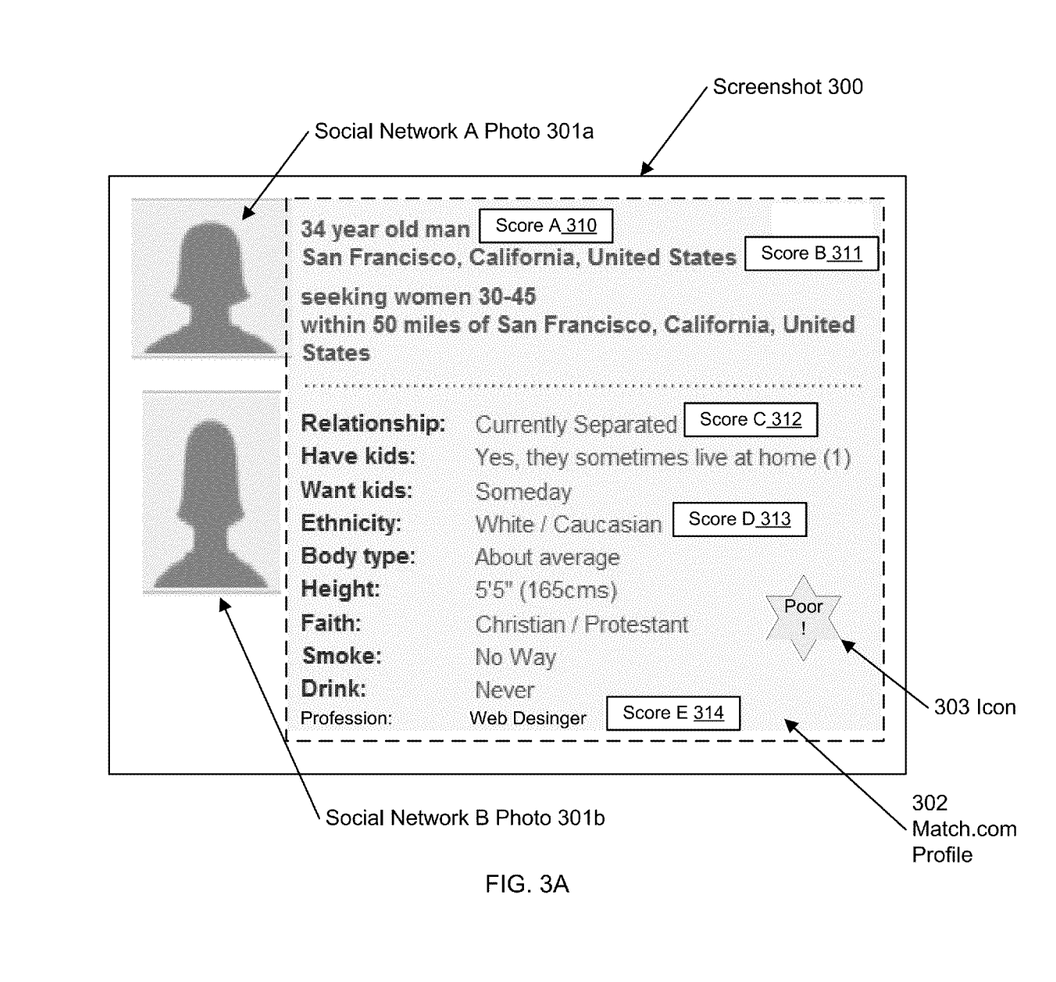
FIGS. 3A and 3B show examples of data aggregation for qualifying a partner candidate in accordance with one or more embodiments of the invention.

FIG. 3A shows a screenshot (300) of an example in accordance with one or more embodiments of the invention. This example may be based on the system (100) of FIG. 1 and the method described with respect to FIG. 2 above.

In this example, a user goes to a business partner seeking website "Match.com" to find there is a newly matched partner candidate based on a partner search criteria previously set up by the user. The user then browses the information of the candidate partner, which is based on what the candidate partner provided (e.g., uploaded) to Match.com. The information is displayed to the user as depicted in the screenshot (300) of FIG. 3A.

As shown, the screenshot (300) includes a profile (302) of the candidate partner provided by Match.com as well as social network A photo (301a), social network B photo (301b), and score A (310) through score E (314) that are inserted by the present invention based on reference information about the partner candidate found in social networks. In particular, the profile (302) includes the general information "34 year old man . . . " and a summary of the candidate partner that is listed below the general information.

Based on embodiments of the invention, the user also observes an icon (303) annotating the profile (303) as well as score A (310) through score E (314) annotating various self-described attributes in the profile (302). Further, the user observes the photo (301a) of the partner candidate retrieved from a personal relation focused social network A and the photo (301b) of the partner candidate retrieved from a different social network B, for example focusing on professional relationship. For example, the icon (303) may be a star shaped element with a letter score "Poor!" indicating an overall poor score assigned to the profile (302) based on reference information of the candidate partner retrieved from social networks where posted information are found relating to this candidate partner. In addition, the score A (310) indicates a validity measure of the self-described attribute "34 year old man" based on age and gender information found in social networks where the partner candidate is active in. Similarly, the score B (311), score C (312), score D (313), and score E (314) indicate validity measures of the self-described attributes "San Francisco, Calif., United States", "Currently Separated", "White/Caucasian", "Web Design" respectively, based on residence, marital status, ethnicity, and profession information about the partner candidate in those social networks.

As described above, each of the score A (310) through score E (314) may be an aggregated characteristics category score that is aggregated from individual scores (i.e., characteristics category scores) each derived from one of multiple social networks. For example, the score A (310), score C (312), and score E (314) may be weighted with more emphasis based on social network data retrieved from the personal relation focused social network while the score B (311) may be weighted with similar or equal emphasis based on social network data retrieved from the personal relation focused social network as well as the professional relation focused social network. In contrast, the score E (314) may be weighted with more emphasis based on social network data retrieved from the profession relation focused social network. Further, the icon (303) may be a further aggregated score of the score A (310) through score E (314).

Figure 3B:
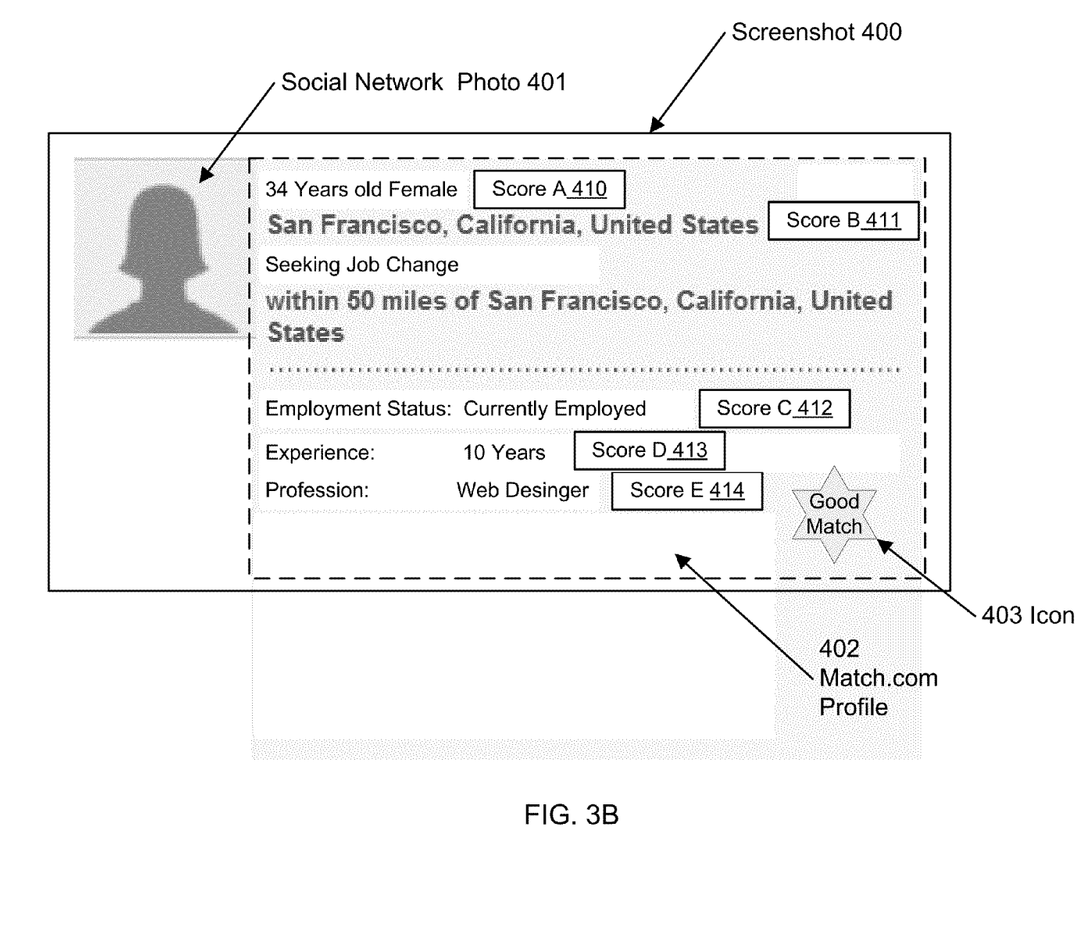
Figure 4:
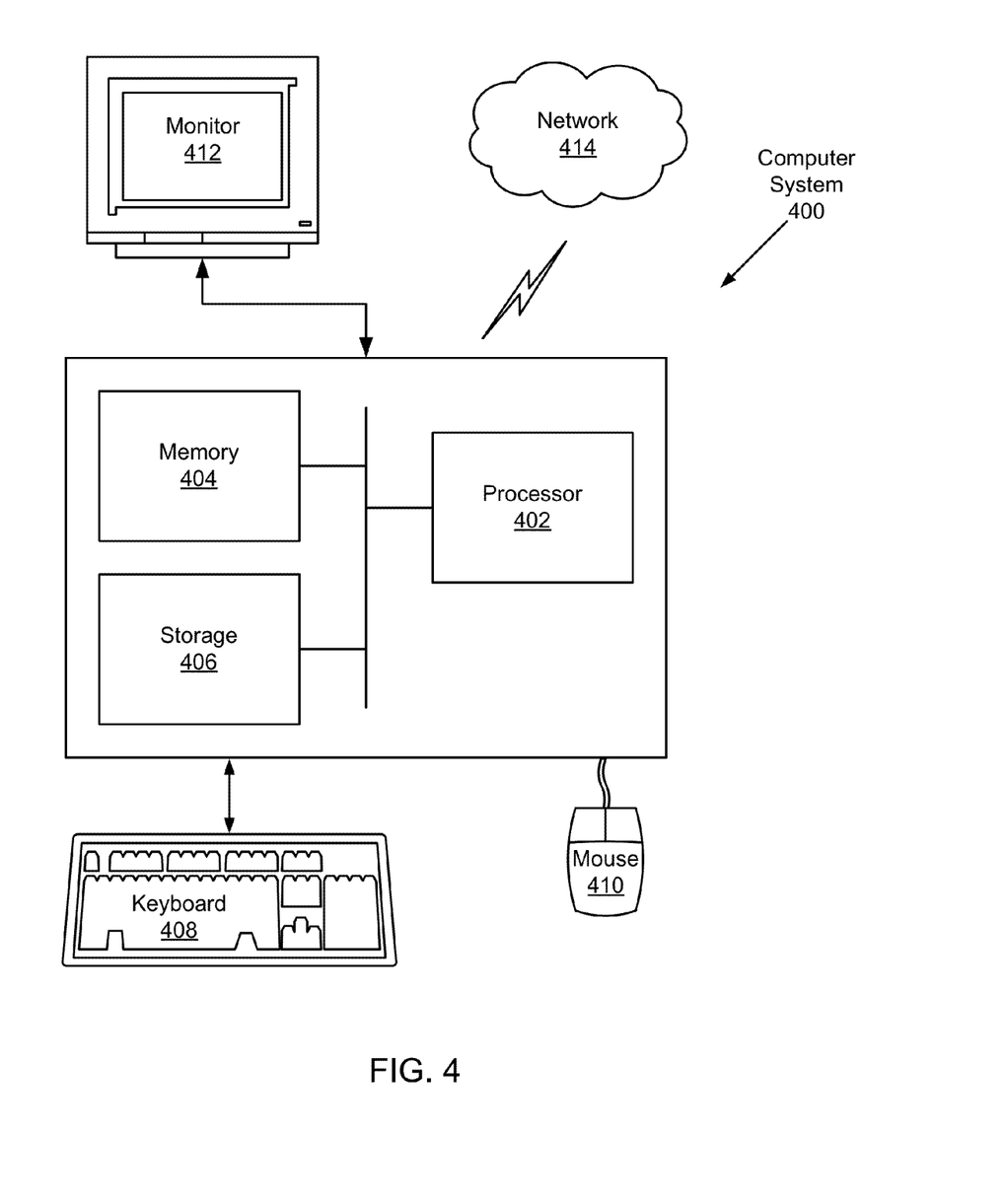
FIG. 4 shows a diagram of a computer system in accordance with one or more embodiments of the invention.

FIG. 3B shows a screenshot (400) of an example in accordance with one or more embodiments of the invention. This example may be based on the system (100) of FIG. 1 and the method described with respect to FIG. 2 above.

In this example, a user goes to a business partner seeking website "Find_A_Web_Desinger.com" to find there is a newly matched partner candidate based on a partner search criteria previously set up by the user. The user then browses the information of the candidate partner, which is based on what the candidate partner provided (e.g., uploaded) to Find_A_Web_Desinger.com. The information is displayed to the user as depicted in the screenshot (400) of FIG. 3B.

As shown, the screenshot (400) includes a profile (402) of the candidate partner provided by Find_A_Web_Desinger.com as well as photo (401) and score A (410) through score E (414) that are inserted by the present invention based on reference information about the partner candidate found in social networks. In particular, the profile (402) includes the general information "34 year old man . . . " and a summary of the candidate partner that is listed below the general information.

Based on embodiments of the invention, the user also observes an icon (403) annotating the profile (403) as well as score A (410) through score E (414) annotating various self-described attributes in the profile (402). Further, the user observes the photo (401) of the partner candidate retrieved from a business relation focused social network based on the emphasis of the partner seeking website. For example, the icon (403) may be a star shaped element with a letter score "Good Match" indicating an overall high score assigned to the profile (402) based on reference information of the candidate partner retrieved from social networks where posted information are found relating to this candidate partner. In addition, the score A (410) indicates a validity measure of the self-described attribute "34 year old female" based on age and gender information found in social networks where the partner candidate is active in. Similarly, the score B (311), score C (312), score D (313), and score E (314) indicate validity measures of the self-described attributes "San Francisco, Calif., United States", "Currently Employed", "10 years", "Web Design" respectively, based on office address, employment status, experience, and profession information about the partner candidate in those social networks.

As described above, each of the score A (310) through score E (314) may be an aggregated characteristics category score that is aggregated from individual scores (i.e., characteristics category scores) each derived from one of multiple social networks. For example, the score A (310) may be weighted with similar or equal emphasis based on social network data retrieved from the personal relation focused social network as well as the professional relation focused social network. In contrast, the other scores may be weighted with more emphasis based on social network data retrieved from the profession relation focused social network. Further, the icon (403) may be a further aggregated score of the score A (410) through score E (414). Accordingly, the user now has a more accurate picture of the newly matched partner candidate's viability based on an insight as to what the partner candidate's social network "friends" say about him/her.

Various algorithms are used to retrieve applicable social network data and to generate individual and aggregated characteristics category scores. For example, a Facebook® application is built to gather personal data from a user's profile. LinkedIn® provides a R.E.S.T. API that is built upon to gather the work related information, such as employment status. How much someone makes could be gleaned by combining data (e.g., employer, job title) from LinkedIn® with data from glassdoor.com or other comparable alternatives. Specific pieces of information are gathered from social networks to make a determination on how much to add to or subtract from a score. For example, if LinkedIn® profile shows a string of jobs, the characteristics category score is assigned as "good" for the "employment" category. Further, if two or more recommendations are found in the LinkedIn® profile, the score is adjusted to "excellent." In contrast, if no jobs or multiple gaps in employment history are found in the LinkedIn® profile, the score is assigned as "room to grow."

In another example, if Facebook® profile shows no profile photo/pictures, the characteristics category score is assigned as "reclusive" for the "personality" category. If updates by the partner candidate are found multiple times a day in the Facebook® posting, the score is assigned as "needy" for the "time frame" category. If 40 to 100 friends are found in the Facebook® profile, the score is adjusted as "well adjusted and real" for the "personality" category. If the candidate is found to update foursquare at least once a week, the score is assigned as "good" for the "adventurous" category. If more than four foursquare entries are updated from different countries/airports, the score is adjusted to "excellent."

In yet another example, the reference information is retrieved from other verifiable information sources. For example, score for "marital status" category is based on reference information from a tax preparation application hosted by an application software service provider of which the partner candidate is a user and opts in to share personal information based on a user agreement. Score for "financial stability" category is assigned as "good" based on finding that the partner candidate has a bank account in a financial management application hosted by an application software service provider of which the partner candidate is a user and opts in to share personal information based on a user agreement. Score for "financial stability" category is adjusted to "excellent" based on finding that the partner candidate has a bank account, a brokerage account, and low debt in a combination of the tax preparation application and the financial management application.

TABLE 1 shows a pseudo-code example of retrieving social network data and generating characteristics category scores to validate self-described attributes found in partner seeking website.

TABLE 1

```
Pseudocode:
==================================
IntuitProfile user;
// Iterate over all the datapoints available in facebook
// Facebook criteria examples: city, marital status, age (from birthday,
Philosophy, political views, music, books, movies, tv, games, activities,
interestes
// Less reliable Facebook datapoints: school, work
// Facebook implied attributes: Aggregate of Friend's data points (as per
above). Especially friends that user interacts with regularly.
// LinkedIn criteria examples: work, title, city, job history
// Implied attributes: title + employer + a lookup at glassdoor or other
dataservice = relative income, length of employment = financial
stability
foreach (datapoint in facebookprofile)
    // if our user already has this datapoint's category like "Marital
status"
    if (datapoint.category in user)
        // Then compare our user's manually entered datapoint with the
one grabbed from Facebook.
        if (datapoint.value == user[datapoint.category]value)
            // if they're the same then mark the accuracy high
            user [datapoint.category].accuracy = 100%;
        else
            // if they're different then run a weighting algorithm that
compares the manually
            // entered data point to the one from Facebook.
            user[datapoint.category].accuracy =
CalculateWeighting(user[datapoint.category].value, datapoint);
    else
        // If the user didn't already have this datapoint category, like
"Marital status"
        // add it to their profile with a high accuracy weighting.
        user.add(datapoint, 100%);
// Compare 2 values and return a weighting that represents how similar
they are.
// Examples:
// Divorced, Married = 0%
// Single, Divorced, In a relationship, Separated, Engaged, Civil Union,
Married
// Divorced, Single = 80%
// Techno Music, Electronic Music = 90%
// The database of weights could be stored similar to a dewey decimal
system
// where "Electonic music" might be represented as 123423.10000
"Techno" is 123423.100423
weight CalculateWeighting(value, datapoint)
{
    // lookup the value in that categories table
    // lookup "marital status", "married"
    writtenValue = lookup(datapoint.category, value);
    importedValue = lookup(datapoint.category, datapoint.value);
    // take the difference of the two, then normalize by the length of the
category.
    // A distance of 2 would be a lot for marital status whose category has
only 7 items.
    // But 2 for music tastes would be inconsequential, as its category
length might be hundreds or thousands.
    AbsoluteValue(writtenValue − importedValue) /
lengthofDatabaseWithCategory(datapoint.category);
}
// Each friend's attributes could be aggregated to compare to the current
user foreach (friend in facebookprofile)
    foreach (datapoint in friend)
        Aggregate(datapoint)
foreach (datapoint in aggregate)
    // modify the accuracy from above, don't replace
    user[datapoint.category].accuracy += CalculateWeighting(datapoint,
user[datapoint.category].value);
// this function is a stub of what the aggregator does
// Generally it adds up all the datapoints comparing all of them and
keeping a count
// of all the additions - to create a normalized aggregate value at the end
Aggregate(datapoint)
    addtoDatapoints(datapoint);
```

Embodiments of the invention may be implemented on virtually any type of computer regardless of the platform being used. For example, as shown in FIG. 3B, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to qualify a partner candidate, comprising:
   detecting, by a partner seeking website and independent of detecting any relationship change of any user of the partner seeking website, that a user is browsing a profile of the partner candidate on a webpage of the partner seeking website, wherein the partner seeking website is configured to allow the user to search a plurality of human partners and to seek a partner relationship from the plurality of human partners, wherein the plurality of human partners comprise the partner candidate;
   retrieving, in response to the indication and based on a characteristics category of a plurality of characteristics categories, a self-described attribute of the partner candidate from the profile of the partner candidate, wherein each of plurality of characteristics categories relates to a characteristic of the partner candidate;
   accessing a first social network to retrieve one or more comments posted by social network friends of the partner candidate regarding the partner candidate, wherein the first social network is used by the partner candidate to exchange social interaction messages with the social network friends of the partner candidate;

parsing, by a processor of a computer system, the one or more comments to extract a first social network data item corresponding to the characteristics category;

determining, by the processor, a first plurality of per category weighting factors corresponding to the plurality of characteristics categories and representing a first focus of the first social network;

comparing, using a keyword library comprising pre-determined keywords and pre-determined keyword similarity measures, the first social network data item and the self-described attribute to generate a first characteristics category score, wherein a range of the first characteristics category score is determined by one of the first plurality of per category weighting factors corresponding to the characteristics category;

assigning, by the processor, the first characteristics category score to the self-described attribute, wherein the first characteristics category score represents a first validity measure of the self-described attribute based on the first social network data; and presenting, on the webpage of the partner seeking website and in response to the user browsing the profile of the partner candidate, the first characteristics category score in association with the self-described attribute to the user, wherein the first characteristics category score is superimposed over the profile displayed on the webpage, and wherein the user determines, based on at least the first characteristics category score, whether the partner candidate is suitable for entering into a partner relationship.

2. The method of claim 1, wherein the comparing step comprises:

matching the first social network data item to a first keyword of the pre-determined keywords;

matching the self-described attribute to a second keyword of the pre-determined keywords; and retrieving a keyword similarity measure from the pre-determined keyword similarity measures based on the first keyword and the second keyword, wherein the keyword library is specific to the characteristics category, wherein the pre-determined keyword similarity measures are indexed in the keyword library by keyword pairs, and wherein the first characteristics category score is generated based on the keyword similarity measure.

3. The method of claim 1, further comprising:

retrieving the self-described attribute from a profile of the partner candidate by analyzing the profile with respect to the characteristics category, wherein extracting the first social network data item corresponding to the characteristics category is in response to retrieving the self-described attribute.

4. The method of claim 3, wherein the first social network data is submitted to the first social network by the partner candidate and a first plurality of social network friends of the partner candidate, wherein accessing the first social network to retrieve the first social network data comprises at least one selected from a group consisting of using an application programming interface of the first social network and obtaining an access credential for an account of the partner candidate in the first social network, wherein the partner candidate is at least one selected from a group consisting of a life partner and a business partner, and wherein the profile is retrieved from a partner seeking website.

5. The method of claim 1, further comprising:

determining a second plurality of per category weighting factors corresponding to the plurality of characteristics categories and representing a second focus of a verifiable information source;

comparing, using the keyword library, the self-described attribute and information about the partner candidate retrieved from the verifiable information source to generate a second characteristics category score, wherein the information about the partner candidate is associated with the characteristics category, wherein a range of the second characteristics category score is determined by one of the second plurality of per category weighting factors corresponding to the characteristics category;

aggregating the first characteristics category score and the second characteristics category score using a weighted average formula based on the first plurality of per category weighting factors and the second plurality of per category weighting factors to generate an aggregated characteristics category score; and assigning the aggregated characteristics category score to the self-described attribute, wherein the aggregated characteristics category score represents an aggregated validity measure of the self-described attribute based on the first social network data and the information about the partner candidate.

6. The method of claim 5, wherein the verifiable information source comprises a second social network, wherein the information regarding the partner candidate comprises second social network data about the partner candidate submitted to the second social network by the partner candidate and a second plurality of social network friends of the partner candidate, and wherein the first focus of the first social network comprises a personal networking focus, wherein the second focus of the second social network comprises a professional networking focus.

7. The method of claim 1, wherein the plurality of characteristics categories comprises at least one selected from a group consisting of a relationship preference category, a financial reliability category, a personality category, a residence address category, a marital status category, a social status category, an age category, a personal interest category, a working profession category, a school history category, a political views category, and a physical appearance category.

8. A system to qualify a partner candidate, comprising:

a hardware processor;

an input module executing on the hardware processor and configured to:

detect, by a partner seeking website and independent of detecting any relationship change of any user of the partner seeking website, that a user is browsing a profile of the partner candidate on a webpage of the partner seeking website, wherein the partner seeking website is configured to allow the user to search a plurality of human partners and to seek a partner relationship from the plurality of human partners, wherein the plurality of human partners comprise the partner candidate;

retrieve, in response to the indication and based on a characteristics category of a plurality of characteristics categories, a self-described attribute of the partner candidate from the profile of the partner candidate, wherein each of plurality of characteristics categories relates to a characteristic of the partner candidate;

a social network interface module executing on the hardware processor and configured to access a first social network to retrieve one or more comments posted by social network friends of the partner candidate regarding the partner candidate, wherein the first social network is used by the partner candidate to exchange social interaction messages with the social network friends of the partner candidate;

a reference data analyzer executing on the hardware processor, coupled to the social network interface, and configured to:
parse the one or more comments to extract a first social network data item corresponding to the characteristics category; and
determine a first plurality of per category weighting factors corresponding to the plurality of characteristics categories and representing a first focus of the first social network; and a validation module executing on the hardware processor, coupled to the reference data analyzer, and configured to:
compare, using a keyword library comprising pre-determined keywords and pre-determined keyword similarity measures, the first social network data item and the self-described attribute to generate a first characteristics category score,
wherein a range of the first characteristics category score is determined by one of the first plurality of per category weighting factors corresponding to the characteristics category;
assign the first characteristics category score to the self-described attribute, wherein the first characteristics category score represents a first validity measure of the self-described attribute based on the first social network data; and
present, on the webpage of the partner seeking website and in response to the user browsing the profile of the partner candidate, the first characteristics category score in association with the self-described attribute to the user,
wherein the first characteristics category score is superimposed over the profile displayed on the webpage, and
wherein the user determines, based on at least the first characteristics category score, whether the partner candidate is suitable for entering into a partner relationship.

9. The system of claim 8, wherein the comparing step comprises:
matching the first social network data item to a first keyword of the pre-determined keywords;
matching the self-described attribute to a second keyword of the pre-determined keywords; and
retrieving a keyword similarity measure from the pre-determined keyword similarity measures based on the first keyword and the second keyword,
wherein the keyword library is specific to the characteristics category,
wherein the pre-determined keyword similarity measures are indexed in the keyword library by keyword pairs, and
wherein the first characteristics category score is generated based on the keyword similarity measure.

10. The system of claim 8, further comprising:
a repository configured to store the first social network data, the social network data item, the plurality of characteristics categories, the first characteristics category score, and the self-described attribute.

11. The system of claim 8, further comprising:
a partner seeking website, wherein the partner candidate is at least one selected from a group consisting of a life partner and a business partner; and
an input module coupled to the validation module and the reference data analyzer, wherein the input module is configured to retrieve the self-described attribute from a profile of the partner candidate stored in the partner seeking website,
wherein the self-described attribute is extracted by analyzing the profile with respect to the characteristics category, and
wherein extracting the first social network data item corresponding to the characteristics category is in response to retrieving the self-described attribute.

12. The system of claim 11, further comprising:
a first social network server of the first social network,
wherein the first social network data is submitted to the first social network by the partner candidate and a first plurality of social network friends of the partner candidate, and
wherein accessing the first social network to retrieve the first social network data comprises at least one selected from a group consisting of using an application programming interface of the first social network and obtaining an access credential for an account of the partner candidate in the first social network.

13. The system of claim 8, further comprising:
a verifiable information source,
wherein the reference data analyzer is further configured to determine a second plurality of per category weighting factors corresponding to the plurality of characteristics categories and representing a second focus of the verifiable information source, and
wherein the validation module is further configured to:
compare, using the keyword library, the self-described attribute and information about the partner candidate retrieved from the verifiable information source to generate a second characteristics category score, wherein the information about the partner candidate is associated with the characteristics category, wherein a range of the second characteristics category score is determined by one of the second plurality of per category weighting factors corresponding to the characteristics category;
aggregate the first characteristics category score and the second characteristics category score using a weighted average formula based on the first plurality of per category weighting factors and the second plurality of per category weighting factors to generate an aggregated characteristics category score; and
assign the aggregated characteristics category score to the self-described attribute, wherein the aggregated characteristics category score represents an aggregated validity measure of the self-described attribute based on the first social network data and the information about the partner candidate.

14. The system of claim 13, further comprising:
a second social network server of a second social network,
wherein the verifiable information source comprises the second social network, wherein the information regarding the partner candidate comprises second social network data about the partner candidate submitted to the second social network by the partner candidate and a second plurality of social network friends of the partner candidate, and wherein the first focus of the first social network comprises a personal networking focus, wherein the second focus of the second social network comprises a professional networking focus.

15. The system of claim 8, wherein the plurality of characteristics categories comprises at least one selected from a group consisting of a relationship preference category, a financial reliability category, a personality category, a residence address category, a marital status category, a social status category, an age category, a personal interest category, a working profession category, a school history category, a political views category, and a physical appearance category.

16. A non-transitory computer readable medium storing instructions to qualify a partner candidate, the instructions when executed by a computer comprising functionality to:

detecting, by a partner seeking website and independent of detecting any relationship change of any user of the partner seeking website, that a user is browsing a profile of the partner candidate on a webpage of the partner seeking website, wherein the partner seeking website is configured to allow the user to search a plurality of human partners and to seek a partner relationship from the plurality of human partners, wherein the plurality of human partners comprise the partner candidate;

retrieve, in response to the indication and based on a characteristics category of a plurality of characteristics categories, a self-described attribute of the partner candidate from the profile of the partner candidate, wherein each of plurality of characteristics categories relates to a characteristic of the partner candidate;

access a first social network to retrieve one or more comments posted by social network friends of the partner candidate regarding the partner candidate, wherein the first social network is used by the partner candidate to exchange social interaction messages with the social network friends of the partner candidate;

parse the one or more comments to extract a first social network data item corresponding to the characteristics category;

determine a first plurality of per category weighting factors corresponding to the plurality of characteristics categories and representing a first focus of the first social network;

compare, using a keyword library comprising pre-determined keywords and pre-determined keyword similarity measures, the first social network data item and the self-described attribute to generate a first characteristics category score,
wherein a range of the first characteristics category score is determined by one of the first plurality of per category weighting factors corresponding to the characteristics category;

assign the first characteristics category score to the self-described attribute, wherein the first characteristics category score represents a first validity measure of the self-described attribute based on the first social network data; and present, on the webpage of the partner seeking website and in response to the user browsing the profile of the partner candidate, the first characteristics category score in association with the self-described attribute to the user, wherein the first characteristics category score is superimposed over the profile displayed on the webpage, and wherein the user determines, based on at least the first characteristics category score, whether the partner candidate is suitable for entering into a partner relationship.

17. The non-transitory computer readable medium of claim 16, wherein the instructions to compare the first social network item and the self-described attribute comprise functionality to:

match the first social network data item to a first keyword of the pre-determined keywords;

match the self-described attribute to a second keyword of the pre-determined keywords; and retrieve a keyword similarity measure from the pre-determined keyword similarity measures based on the first keyword and the second keyword, wherein the keyword library is specific to the characteristics category, wherein the pre-determined keyword similarity measures are indexed in the keyword library by keyword pairs, and wherein the first characteristics category score is generated based on the keyword similarity measure.

18. The non-transitory computer readable medium of claim 16, the instructions further comprising functionality to:

retrieve the self-described attribute from a profile of the partner candidate by analyzing the profile with respect to the characteristics category, wherein extracting the first social network data item corresponding to the characteristics category is in response to retrieving the self-described attribute.

19. The non-transitory computer readable medium of claim 18, wherein the first social network data is submitted to the first social network by the partner candidate and a first plurality of social network friends of the partner candidate, wherein accessing the first social network to retrieve the first social network data comprises at least one selected from a group consisting of using an application programming interface of the first social network and obtaining an access credential for an account of the partner candidate in the first social network, wherein the partner candidate is at least one selected from a group consisting of a life partner and a business partner, and wherein the profile is retrieved from a partner seeking website.

20. The non-transitory computer readable medium of claim 16, the instructions further comprising functionality to:

determine a second plurality of per category weighting factors corresponding to the plurality of characteristics categories and representing a second focus of a verifiable information source;

compare, using the keyword library, the self-described attribute and information about the partner candidate retrieved from the verifiable information source to generate a second characteristics category score, wherein the information about the partner candidate is associated with the characteristics category, wherein a range of the second characteristics category score is determined by one of the second plurality of per category weighting factors corresponding to the characteristics category;

aggregate the first characteristics category score and the second characteristics category score using a weighted average formula based on the first plurality of per category weighting factors and the second plurality of per category weighting factors to generate an aggregated characteristics category score; and assign the aggregated characteristics category score to the self-described attribute, wherein the aggregated characteristics category score represents an aggregated validity measure of the self-described attribute based on the first social network data and the information about the partner candidate.

21. The non-transitory computer readable medium of claim 20,
wherein the verifiable information source comprises a second social network,
wherein the information regarding the partner candidate comprises second social network data about the partner candidate submitted to the second social network by the partner candidate and a second plurality of social network friends of the partner candidate, and
wherein the first focus of the first social network comprises a personal networking focus, wherein the second focus of the second social network comprises a professional networking focus.

22. The non-transitory computer readable medium of claim 16, wherein the plurality of characteristics categories comprises at least one selected from a group consisting of a relationship preference category, a financial reliability category, a personality category, a residence address category, a marital status category, a social status category, an age category, a personal interest category, a working profession category, a school history category, a political views category, and a physical appearance category.

* * * * *